2,762,684

PREPARATION OF THORIUM TETRAHALIDES

Eugene Wainer, Cleveland Heights, Ohio, assignor, by mesne assignments, to Horizons Titanium Corporation, Princeton, N. J., a corporation of New Jersey No Drawing. Application November 19, 1952, Serial No. 319,793

2 Claims. (Cl. 23—14.5)

This invention relates to the production of thorium tetrahalides other than the tetrafluoride and, more particularly, to the production of these salts directly in the anhydrous condition.

The halides of thorium are of particular importance because they are generally the starting compounds used for the production of other thorium salts. At present the generally accepted method of producing these halides is by halogenation, usually at temperatures of at least 1000° C., of the oxide, carbide or carbonitride of thorium. The halogenating agents for this purpose include not only the halogen itself but also the hydrogen halides and carbon tetrahalides. Such halogenation procedures, particularly at the elevated temperatures required, dictate the use of corrosion-resistant apparatus and the maintenance of numerous safety requirements for protection of operating personnel.

I have now devised a method of producing thorium tetrahalides other than the tetrafluoride without using a corrosive or hazardous halogen or halogen compound. Thus, the method of my invention makes it possible to produce such a thorium tetrahalide with conventional equipment and without hazard to operating personnel. Moreover, the method of my invention is amenable to a recycling or recovery of the by-products of the reaction with a resulting over-all economy which makes this method particularly attractive for the commercial scale production.

The method of producing thorium tetrahalides other than the tetrafluoride pursuant to my present invention comprises heating to a temperature of at least 850° C. an anhydrous mixture of a thorium fluoride and a chloride, bromide or iodide of magnesium, calcium or lithium, and withdrawing from the heated mixture the resulting evolved vapors of the corresponding thorium tetrachloride, tetrabromide or tetraiodide. In the course of this reaction, the initial magnesium, calcium or lithium halide is converted to the corresponding fluoride and this fluoride in turn may either be used as a source of fluorine for the production of the thorium fluoride used as the starting material or it may be transformed into another halide and used as the reagent which is reacted with the thorium fluoride.

The thorium fluorides useful as starting materials in the method of my invention include the simple and complex fluorides. Thus, a simple fluoride such as thorium tetrafluoride may be used, or a complex fluoride such as the alkali metal double fluorides of thorium may be used. Because of the relatively lower cost of these complex fluorides and their ease of production from crude thorium-containing materials pursuant to the recycling step of my invention, these complex fluorides are presently preferred. Thus, both the sodium and potassium double fluorides of thorium may be used with particular advantage in the practice of the method of my invention.

The thorium fluoride is converted to the desired tetrahalide pursuant to my invention by reaction with a halide other than the fluoride of either magnesium, calcium or lithium. The choice of the halide of these latter metals depends entirely upon the tetrahalide of thorium which it is desired to produce. For example, magnesium chloride will, by the method of the invention, yield thorium tetrachloride. The choice in the use of either magnesium, calcium or lithium as the metal component of this halide is primarily one of economics and may differ under varying circumstances in the availability of these metal halides. Thus, I have found that both magnesium and lithium chlorides yield thorium tetrachloride with at least 95% efficiency whereas calcium chloride produces the same result at about 85% efficiency. The bromides of these metals are nearly as efficient as the corresponding chlorides, whereas the iodides give considerably lower yields. Of the two more efficient metals, i. e. the magnesium and lithium chlorides, bromides and iodides, the magnesium halides are presently preferred because they are more readily available and are considerably less expensive than the corresponding lithium halides.

The reaction between the thorium fluoride and the magnesium, calcium or lithium halide other than the fluoride will produce the desired thorium tetrahalide provided that the reactants are substantially completely anhydrous at the time of reaction. Toward this end, the individual reactants may be rendered anhydrous before being introduced into the reaction zone, or the admixed reactants may be subjected to a dehydrating operation, advantageously in situ in the reaction zone. The alkali metal-thorium double fluoride may be rendered completely anhydrous by heating it to a temperature between 160° and 200° C. in a vacuum of about 1 millimeter of mercury or less. The lithium, magnesium and calcium halides used in practicing the invention may be rendered anhydrous by any of a variety of techniques. One technique, in the case of the chlorides for example, comprises heating the chloride to about 350°–400° C. while passing dry hydrogen chloride gas through the salt until the weight of the salt becomes constant. An alternative technique is to admix the magnesium, calcium or lithium halide with the corresponding ammonium halide and then heat the mixture to a temperature of about 500° C. under subatmospheric pressure. A third effective technique is to heat the magnesium, calcium or lithium halide to a temperature of about 350°–400° C. in a vacuum of about 1 millimeter of mercury or less. Where the reactants are admixed prior to introduction into the reaction zone, the mixture of salts may be rendered anhydrous by heating it to a temperature of about 350° C. under vacuum pumping conditions until the pressure in the reaction zone can be maintained as low as about 200 microns. In the anhydrous condition resulting from any of the aforementioned procedures, the thorium tetrahalide produced by the method of my invention will be virtually anhydrous and substantially free of products of hydrolysis.

Inasmuch as impurities introduced with the reactants may be carried over into the thorium tetrahalide product of the method of the invention, it is preferable to use substantially pure reactants. The thorium-alkali metal double fluoride, for example, may be obtained in a state of suitable purity by at least one recrystallization of the double fluoride from an aqueous medium. This can be done by digesting the thorium-alkali metal double fluoride in a 2 to 3 percent aqueous solution of hydrofluoric acid at a temperature of about 90° C. for a period of about one hour, by then cooling the resulting double fluoride solution to ambient temperature to effect recrystallization of the double fluoride, and then filtering and washing the double fluoride with water. The halides of magnesium, calcium and lithium, on the other hand, are available in commercial quantities in a state of purity wholly suitable for use directly in the practice of the method of my invention without intermediate purification.

The amounts of the two reagents used in the practice of the invention may vary considerably without significant effect upon the efficiency of the reaction. I have found, however, that substantially stoichiometric quantities of the reactants lead to as good results as an excess of either reactant and that furthermore the use of stoichiometric quantities of the reactants results in the formation of a reaction residue containing a minimum of unconsumed reactants. Inasmuch as it is my presently preferred practice to recycle the reaction residue, it is advantageous to use substantially stoichiometric amounts of the reactants and thereby minify the burden of recycled unconsumed charge components.

Temperatures of at least about 850° C. are required for effecting reaction between the aforementioned charge components. Higher temperatures promote more rapid and more complete reaction, and at about 900°–950° C. the reaction is substantially complete and the resulting thorium tetrahalide is completely volatilized from the reaction mass. Still higher temperatures may be used in practicing the invention although they tend to transform the solid reagents or residues, or both, to the molten state with resulting decrease in the rate of evolution of the thorium tetrahalide vapors. Thus, at temperatures substantially higher than about 850° C., fusion takes place in the reaction zone when the alkali metal component of the thorium double fluoride is potassium, whereas the corresponding sodium salt permits reaction in the solid state at temperatures up to about 900° C. The only upper limit to the range of temperatures useful in practicing my invention is that at which volatilization of the charge components or of the residual products occurs with resulting contamination of the volatilized thorium tetrahalide.

The physical state of the reactants may, as indicated hereinbefore, be that of either a solid or a liquid. Because of the ease of handling a solid charge and a solid residue, the solid state reaction is presently preferred, and with this prescription in mind the reaction temperature should be limited to that below which fusion of the reactants and of the residue of the reaction remain solid. I have found it particularly advantageous, when carrying out the reaction in the solid state, to charge the reactants in the form of briquettes in a batch operation. The water of hydration of the components of the charge mixture is sufficient to promote agglomeration of the charge components under compressive pressure, and the resulting briquettes are then subjected to dehydration in the reaction zone prior to carrying out the reaction. The size of such briquettes is not critical, the most advantageous size depending largely upon the size and shape of the reaction vessel. For example, in a reaction chamber 10 inches in diameter, I have found that briquettes in the form of about 1 inch cubes are particularly satisfactory. On the other hand, where it is desired to carry out the reaction in the liquid phase, the charge components and their ultimate residue may be maintained in a suitable fluid condition by the use of a reaction temperature of approximately 1000° C. If desired, the fluid state reaction may be carried out in a diluent bath composed of one or more alkali metal halides. In any such fused-state operation, the reactants may be continuously or at least incrementally charged to the reaction crucible, or the crucible may be initially charged with a relatively large amount of the magnesium, calcium or lithium halide and the thorium fluoride is subsequently charged incrementally to the fused body of the other halide during evolution of the desired thorium tetrahalide.

Regardless of the physical state of the reactants, the atmosphere in which the reaction is carried out should be substantially inert so as to avoid contamination of the evolved thorium tetrahalide. For this purpose either vacuum pumping or sweeping with an inert gas such as argon or helium may be used effectively. In either procedure, the pumping or sweep circuit should be such as to remove the evolved thorium tetrahalide vapor as it is formed and deliver it to a cooling zone in which the vapor may condense and thence be recovered. In practice, I have found it advantageous to use a combination of these expedients. For example, after a substantial vacuum is established while maintaining the charge at an elevated temperature below the reaction temperature to insure dehydration of the charge, argon may be admitted to the reaction vessel, and then the argon and evolved thorium tetrahalide vapor are withdrawn during the subsequent reaction by means of active vacuum pumping. On the other hand, if the charge is completely dehydrated prior to introduction into the reaction vessel, it may be charged continuously or incrementally into a vessel such as a rotary kiln wherein the reaction is carried out while maintaining an inert atmosphere by sweeping the interior of the vessel with an appropriate inert gas. In the latter case, the operation can be made continuous by charging the reactants to one portion of the kiln, withdrawing the residue from another portion of the kiln, and recovering the evolved thorium tetrahalide from the effluent diluent sweep gas stream.

Recovery of the evolved thorium tetrahalide may be readily effected by withdrawing the evolved vapor from the reaction zone and by permitting it to cool with resulting condensation either to the liquid or solid state. In practice, I have found it to be particularly satisfactory to interpose a condenser in a vapor draw-off line beyond the reaction zone, advantageously between the reaction zone and a vacuum pump where the pump serves not only to draw off the evolved thorium tetrahalide vapor but also to maintain a suitably inert reaction atmosphere. The thorium tetrahalide vapor thus removed from the reaction zone is readily condensed to the solid form by the degree of cooling effected by a water cooled condenser, and virtually none of the tetrahalide is lost by carry-over into the vacuum pump if the condenser capacity is adequate.

Other than the evolved vapor of the desired thorium tetrahalide, the products of the reaction are normally solid. For example, in the production of thorium tetrachloride by reaction between thorium tetrafluoride and magnesium chloride, the residual reaction product consists of magnesium fluoride. Where, however, the thorium fluoride is a complex salt such for example as potassium thorium fluoride ($K_2ThF_6$), the residue consists of magnesium fluoride and potassium fluoride. The latter residue is particularly amenable to recovery as a source of fluorine in the production of the complex or double fluoride of thorium from raw thorium-containing material. It will be seen, accordingly, that all of the fluorine component and all of the alkali metal component of the residue are recovered by this procedure with resulting economy of the raw materials.

The re-use of the solid residue of the reaction stage in the practice of my invention does not in general entail any intermediate treatment of this residue. For example, the residue resulting from the reaction between thorium fluoride and a magnesium halide other than the fluoride comprises water-soluble magnesium fluoride (accompanied by an alkali metal fluoride when an alkali metal double fluoride of thorium is used as a starting material). When a lithium halide is used as a reagent in the production of the thorium tetrahalide, the residue comprises the relatively water-insoluble lithium fluoride, and the residue obtained with a calcium halide comprises the still more water-insoluble calcium fluoride. Accordingly, the magnesium fluoride-containing residue may be used directly in an aqueous phase process for the production of a thorium fluoride, and the lithium or calcium fluoride-containing residue may be used directly in a fusion process for the production of the thorium fluoride starting material. For example, thorium sulfate, produced by sulfuric acid digestion of thorium dioxide raw material, will react readily in the hot aqueous phase with magnesium fluoride and an alkali metal fluoride to form the corresponding alkali metal—thorium double fluoride. As pointed out hereinbefore, when such a double fluoride is reacted with a magnesium halide other than the fluoride in practicing the method of my invention, the solid residue of that reaction will consist essentially of precisely such a mixture of magnesium fluoride and alkali metal fluoride as that required for conversion of thorium sulfate to the corresponding double fluoride with an alkali metal. The lithium fluoride in a residue containing this salt may also be readily converted to lithium chloride and recycled directly in the method of my invention. This conversion may be readily effected by reacting the lithium fluoride with calcium chloride in the aqueous phase with the resulting formation by metathesis of lithium chloride and the still more water-insoluble calcium fluoride. The lithium chloride may be recovered from the separated aqueous phase by evaporation and is then returned directly as the lithium halide reactant in the method of the invention, and any alkali metal fluoride in the calcium fluoride precipitate and in the remaining aqueous liquor can be used in the production of the simple thorium fluoride or of the double fluoride of thorium and an alkali metal. Thus, the method of my invention is characterized by the possibility of recycling the by-products of the main reaction with resulting economy of all components of the reactants other than those which are combined in the desired main product of the reaction.

The following specific examples are illustrative though not limitative of the practice of the method of my invention:

*Example I*

The reaction was carried out in a graphite reaction vessel heated by an exteriorly surrounding induction coil. The graphite vessel, which was tubular in shape, was enclosed in a gas-impervious outer vessel so that vacuum conditions could be maintained within the reaction vessel. One end of the heated reaction vessel communicated directly with a water cooled stainless steel condensing vessel, and the condenser was further provided with a vacuum line having a cold trap and communicating directly with a vacuum pump.

A reaction charge was prepared by thoroughly mixing 4965 parts by weight of potassium thorium fluoride as the tetrahydrate with 2035 parts by weight of magnesium chloride as the hexahydrate. These charge weights are given on an anhydrous basis and the necessary adjustment was made to compensate for the water of hydration present in the tetrahydrate ($K_2ThF_6.4H_2O$) and hexahydrate ($MgCl_2.6H_2O$) actually employed. The water of hydration in the components of this mixture was sufficient to effect binding of the components when the mixture was compressed into the form of approximately one inch cubes. The briquettes were charged into the reaction vessel and the vessel was sealed. Thereupon, the temperature of the charge was raised slowly to 350° C. while maintaining active exhausting by the vacuum pump until the pressure within the vessel dropped to about 200 microns. The vacuum pump was then stopped and dry argon was admitted into the reaction zone. The argon supply was then terminated and the temperature of the charge was raised to 900° C. while resuming operation of the vacuum pump. After maintaining these latter conditions for about one hour, heating of the reaction vessel was discontinued while nevertheless continuing the vacuum pumping. When the reaction vessel and its charge had cooled to approximately room temperature, the vessel and the condenser were opened and their contents were separately recovered. The white condensate removed from the condensing zone comprised 3750 parts by weight, somewhat greater than the theoretical yield, thus indicating that there was a small amount of hydrolysis of the thorium tetrachloride during its extraction from the reaction zone. The solid residue within the reaction vessel comprised 2440 parts by weight of a somewhat sintered mixture of anhydrous magnesium fluoride and anhydrous potassium fluoride. This mixture, then reacted in an aqueous medium with thorium sulfate, yielded a solution of potassium thorium fluoride ($K_2ThF_6$), and this double fluoride was separated from its solution by crystallization and drying to supply potassium thorium fluoride tetrahydrate for a subsequent run.

*Example II*

The operation described in Example I was repeated with identical conditions except for the substitution of 3920 parts by weight of sodium thorium fluoride ($Na_2ThF_6$) for the 4965 parts of hydrous potassium thorium fluoride. The yield of thorium tetrachloride was the same as that reported in Example I and the reaction zone residue consisted of 2100 parts of weight of a substantially equimolar mixture of sodium fluoride and magnesium fluoride.

It must be understood that the method of my invention is equally applicable to the production of thorium tetrachloride, tetrabromide and tetraiodide and that specific examples directed herein to the use of the chlorides of magnesium, lithium and calcium are merely illustrative of similar results obtainable with either the bromides or iodides of these metals.

The use of the hereindescribed method for the production of zirconium and hafnium tetrahalides other than the fluoride is described and claimed in my application Serial No. 319,792, and the use of this method for the production of the corresponding halides of metals other than the alkali metals, alkaline earth metals and rare earth metals is described and claimed in my application Serial No. 319,791, both filed concurrently herewith.

I claim:

1. The method of producing a thorium tetrahalide other than the tetrafluoride which comprises: forming an anhydrous charge mixture of (1) a double fluoride of thorium and of an alkali metal of the group consisting of sodium and potassium and (2) a halide other than the fluoride of a metal of the group consisting of magnesium, calcium and lithium in which the ingredients are stoichiometrically proportioned to produce as reaction products, the desired thorium tetrahalide and a mixture of the fluorides of the alkali metal and the metal of the group consisting of magnesium, calcium and lithium; heating the charge mixture to a reaction temperature of at least 850° C. in an inert atmosphere; removing the desired thorium tetrahalide in the form of a vapor evolved from the heated mixture; recovering the alkali metal and fluoride values in the residue obtained after evolution of the thorium tetrahalide from the said residue by reacting the residue mixture of fluorides with a thorium sulfate to produce a double fluoride of an alkali metal and thorium, and reintroducing said double fluoride into the process for further reaction with a stoichiometric proportion of the halide other than the fluoride of a metal of the group consisting of magnesium, calcium and lithium.

2. The method of producing a thorium tetrahalide other than the tetrafluoride which comprises: forming an anhydrous charge mixture of (1) a double fluoride of thorium and of an alkali metal of the group consisting of sodium and potassium and (2) a halide other than the fluoride of magnesium in which the ingredients are stoichiometrically proportioned to produce as reaction products the desired thorium tetrahalide and a mixture of the fluorides of the alkali metal and magnesium; heating the charge mixture to a reaction temperature of at least 850° C. in an inert atmosphere; removing the desired thorium tetrahalide in the form of a vapor evolved from the heated mixture; recovering the alkali metal and fluoride values in the residue obtained after evolution of the thorium tetrahalide from the said residue by reacting the residue mixture of fluorides with a thorium sulfate in the hot aqueous phase to produce a double fluoride of an alkali metal and thorium, and reintroducing the said double fluoride into the process for further reaction with a stoichiometric proportion of a magnesium halide other than the fluoride.

References Cited in the file of this patent

UNITED STATES PATENTS

| | | |
|---|---|---|
| 1,699,234 | Gaus et al. | Jan. 15, 1929 |
| 2,475,287 | Kawecki | July 5, 1949 |
| 2,626,203 | Blumenthal | Jan. 20, 1953 |
| 2,650,873 | Sprague | Sept. 1, 1953 |
| 2,694,616 | Wainer | Nov. 16, 1954 |
| 2,694,617 | Cardon et al. | Nov. 16, 1954 |

OTHER REFERENCES

"A Course in General Chemistry," by McPherson and Henderson, third ed., page 644; Ginn and Co., N. Y.

Lowry's "Inorganic Chemistry," 1931, second edition, page 1031; MacMillan and Co., Ltd., London.

"High Temperature Experiments with Zirconium and Zirconium Compounds," by W. J. Kroll, W. R. Carmody and A. W. Schlecten, page 6 and pages 1 and 2 of flyleaf which specifically state, "Work on this manuscript completed August 1950." Bureau of Mines Report of Investigations 4915, U. S. Dept. of the Interior, November 1952.